Figure 1:
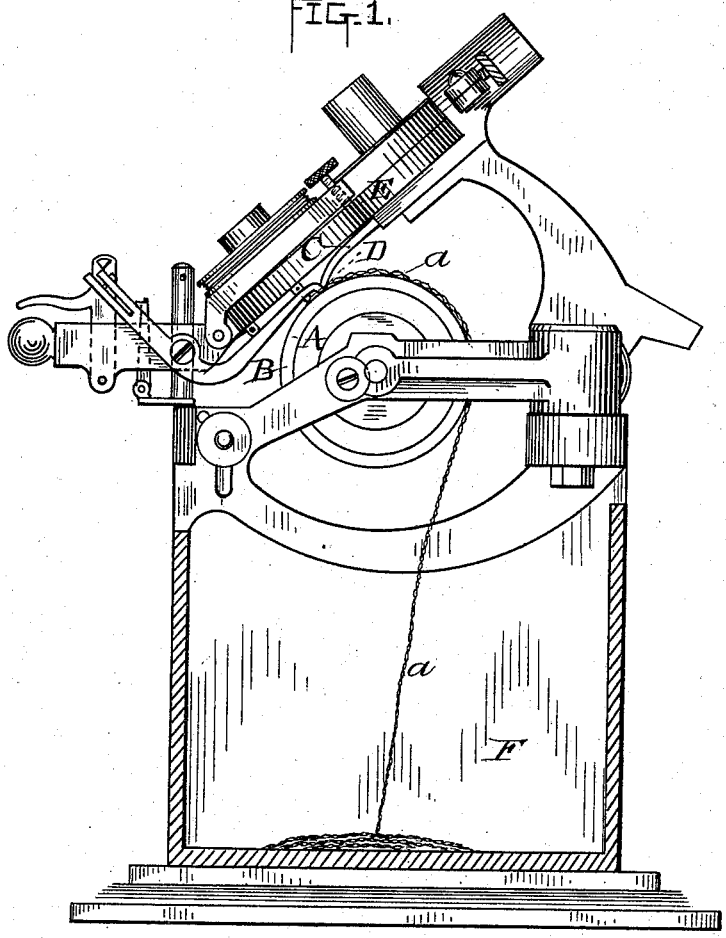

(No Model.)

T. A. EDISON.
PROCESS OF TREATING PHONOGRAM BLANKS.

No. 406,571. Patented July 9, 1889.

WITNESSES:

INVENTOR
Thomas A. Edison
BY
ATTORNEYS

UNITED STATES PATENT OFFICE.

THOMAS A. EDISON, OF LLEWELLYN PARK, NEW JERSEY.

PROCESS OF TREATING PHONOGRAM-BLANKS.

SPECIFICATION forming part of Letters Patent No. 406,571, dated July 9, 1889.

Application filed February 11, 1889. Serial No. 299,454. (No specimens.)

*To all whom it may concern:*

Be it known that I, THOMAS A. EDISON, a citizen of the United States, residing at Llewellyn Park, in the county of Essex and State of New Jersey, have invented a certain new and useful Process of Treating Phonogram-Blanks, (Case No. 822,) of which the following is a specification.

My improved phonograph, as is well known, is provided with a turning-off tool for turning off the surface of the phonogram-blank. This is mounted, preferably, to operate with the recorder, so that the old record will be turned off at the same time that a new record is made.

For my phonogram-blank I employ a hard brittle material, such as a hard metallic soap or a mixture of wax with some hardening material. The chips which are produced in turning off such a blank have a high degree of electrification, which, I consider, is due to the rending of the material. They adhere to the surface of the blank and interfere seriously with the action of the recorder. They also adhere to the adjoining parts of the machine, and when it is attempted to brush or blow them off of the blank they fly in all directions and cover surrounding objects. The harder the material of the phonogram-blanks the greater seems to be the electrification of the chips, and since such hard materials produce the most perfect records it will be seen that the difficulty is one of importance. How to overcome this obstacle has proved one of the most difficult problems to solve which I have met with in my work upon the phonograph. I have found that by applying to the surface of the blank just before turning it off a solution which will slightly dissolve the material of the blank, or which will produce a chemical reaction upon such surface, so as to soften and toughen the surface, a continuous chip will be produced by the turning-off tool, which has little or no electrification, or the electrification of which is less powerful than the weight of the chip, so that the chip falls into the receptacle beneath the blank and leaves the surface of the blank perfectly clean for the recording-point, the dust produced by which can be readily blown or brushed off of the surface. The action of the solution does not penetrate to as great a depth as the turning-off tool, since the surface upon which the recorder acts must be of the hard material. My turning-off tool takes a chip about seven one-thousandths of an inch thick. The penetration of the solution to the depth of five one-thousandths of an inch, or even less, will be sufficient to accomplish the purpose. The chip is made continuous. It is wet, and hence not electrical. The surface upon which it falls as it leaves the point of the turning-off tool is the wet uncut and unelectrified surface, and the chip is made heavier by the absorption of the solution. All or part of these conditions may be instrumental in producing the result.

Instead of using a solution which attacks the surface of the blank and produces a tough film of the material of the surface itself, a coating may be applied which adheres to the surface and on drying produces a tough film which forms a part of the chip and serves to hold it together as a continuous strip, so that the weight of the chip will be greater than the electrification of its under surface.

The material employed to soften and toughen the surface of the blank will depend, of course, upon the composition of the blank itself. For blanks made from hard metallic soaps, which I prefer, I may employ a weak alkaline solution, such as a one-per-cent. solution of caustic soda. The strength of the solution will vary upon the depth of the chip and the nature of the substance acted upon. With blanks of the hard metallic soaps I have found that water may be employed, since such soaps seem to be slightly soluble. The weak alkaline solution or the water is applied with a sponge after the blank is placed upon the machine, the surface being completely wet with the solution and any surplus being removed, if necessary, by a dry sponge or piece of chamois-skin. When the surface is dry, the spectacle-frame carrying the turning-off tool and the recorder is lowered into position, when a record is made and the surface turned off simultaneously.

With phonogram-blanks of other substances or compositions solvents or softeners of the particular substances of the blanks will be employed.

To produce tough films upon the surface of the blanks many substances may be applied to the blanks, such as gum-balata dissolved in bisulphide of carbon, or gun-cotton dissolved in acetate of amyle, or glue and water.

Figure 2:
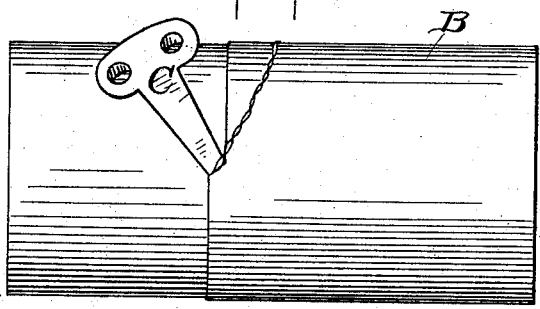

In the accompanying drawings, forming a part hereof, Figure 1 is a sectional view of the phonograph, showing the turning-off tool and recorder in position for operation; and Fig. 2 is a top view of the phonogram-blank and turning-off tool.

A is the phonogram-cylinder, upon which is the removable phonogram-blank B, made with a considerable body of the recording material, so that a number of records can be made upon it by turning off old records.

C is the turning-off tool, and D is the point of the recorder. The recorder and turning-off tool are mounted upon the spectacle-frame E and are brought into operation at the same time.

The surface of the phonogram-blank is treated as has been explained. The chip $a$ produced by the turning-off tool falls into the receptacle F.

What I claim as my invention is—

1. The process of treating phonogram-blanks having hard brittle surfaces, consisting in producing a tough film upon the surfaces of such blanks preparatory to turning them off, substantially as and for the purpose set forth.

2. The process of treating phonogram-blanks having hard brittle surfaces, consisting in applying to such blanks preparatory to turning them off a solution which attacks the substance of the blanks and softens and toughens the surface, substantially as and for the purpose set forth.

This specification signed and witnessed this 1st day of February, 1889.

THOMAS A. EDISON.

Witnesses:
W. Pelzer,
D. H. Driscoll.